(12) United States Patent
Chen et al.

(10) Patent No.: US 9,257,866 B2
(45) Date of Patent: Feb. 9, 2016

(54) WIRELESS CHARGING DEVICE

(71) Applicants: CHAMP TECH OPTICAL (FOSHAN) CORPORATION, Foshan (CN); Foxconn Technology Co., Ltd., New Taipei (TW)

(72) Inventors: Hai-Lin Chen, Foshan (CN); Di-Qiong Zhao, Foshan (CN); Ching-Hsing Huang, New Taipei (TW)

(73) Assignees: CHAMP TECH OPTICAL (FOSHAN) CORPORATION, Foshan (CN); Foxconn Technology Co., Ltd., New Taipei (TW)

( * ) Notice: Subject to any disclaimer, the term of this patent is extended or adjusted under 35 U.S.C. 154(b) by 183 days.

(21) Appl. No.: 14/014,393

(22) Filed: Aug. 30, 2013

(65) Prior Publication Data

US 2015/0042268 A1 Feb. 12, 2015

(30) Foreign Application Priority Data

Aug. 9, 2013 (CN) .......................... 2013 1 0344793

(51) Int. Cl.
*H02J 7/00* (2006.01)
*H02J 7/02* (2006.01)
*H02J 17/00* (2006.01)

(52) U.S. Cl.
CPC ............... *H02J 7/025* (2013.01); *H02J 7/0042* (2013.01); *H02J 17/00* (2013.01)

(58) Field of Classification Search
CPC .................................. H02J 7/025; H02J 5/005
USPC ........................................................ 320/108
See application file for complete search history.

(56) References Cited

U.S. PATENT DOCUMENTS

| | | | |
|---|---|---|---|
| 2008/0303479 A1* | 12/2008 | Park et al. ...................... | 320/108 |
| 2011/0227527 A1* | 9/2011 | Zhu et al. ...................... | 320/108 |
| 2012/0019208 A1* | 1/2012 | Clouser ......................... | 320/115 |
| 2013/0161455 A1* | 6/2013 | DeJong .................. | F16M 11/04 248/176.3 |

* cited by examiner

*Primary Examiner* — Nghia Doan
(74) *Attorney, Agent, or Firm* — Novak Druce Connolly Bove + Quigg LLP

(57) ABSTRACT

The present disclose relates to a wireless charging device for charging a portable electronic device. The wireless charging device includes a charging panel, a transmitting unit and at least one adsorbent unit. The charging panel includes a first surface and a second surface opposite to the first surface. The first surface supports the portable electronic device. The charging panel defines a through hole through the first surface. The transmitting unit includes a coil for generating electromagnetic signals. The adsorbent unit extends through the through hole of the charging panel and adsorbs the portable electronic device.

10 Claims, 2 Drawing Sheets

WIRELESS CHARGING DEVICE

BACKGROUND

1. Technical Field

The disclosure relates to a charging system, and particularly to a wireless charging device.

2. Discussion of Related Art

With the continued improvements in the field of Information Technology (IT) and the increasing prevalence of a wide variety of portable electronic products, a variety of techniques have been developed that supply power for portable electronic products. Technology for supplying power typically used a power line in the past. However, wireless power transmission technology, which is capable of wirelessly supplying power, has recently been developed.

Wireless power transmission technology includes technology for delivering electrical energy in the form of electromagnetic waves, electromagnetic induction, or electromagnetic resonance, for example. Wireless power transmission technology makes it possible to supply power wirelessly anytime and anywhere, without the use of power lines, such as, electric wires. When a portable electronic device is charged by a wireless charging device, the portable electronic device is arranged on a charging panel of the wireless charging device, however, the portable electronic device is easy to fall from the charging panel and may be damaged; therefore, the typical wireless charging device is unreliable for charging the portable electronic device.

Therefore, what is needed is a wireless charging device which can overcome the described limitations.

BRIEF DESCRIPTION OF THE DRAWINGS

Many aspects of the disclosure can be better understood with reference to the following drawing. The components in the drawing are not necessarily drawn to scale, the emphasis instead being placed upon clearly illustrating the principles of the present light emitting diode device for microminiaturization. Moreover, in the drawing, like reference numerals designate corresponding parts throughout the whole view.

DETAILED DESCRIPTION OF EMBODIMENTS

Figure 1:
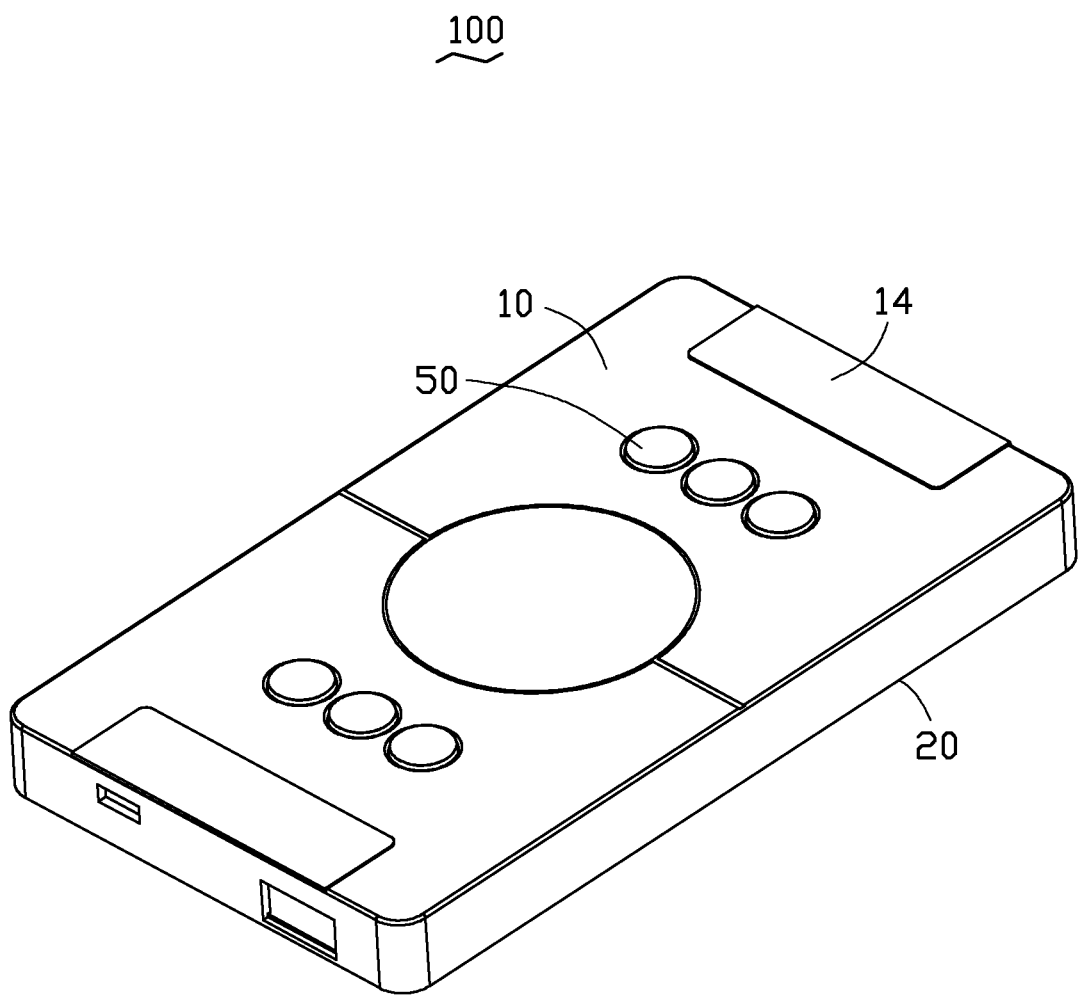
FIG. 1 is a schematic, isometric view of a wireless charging device according to an exemplary embodiment.
Figure 2:
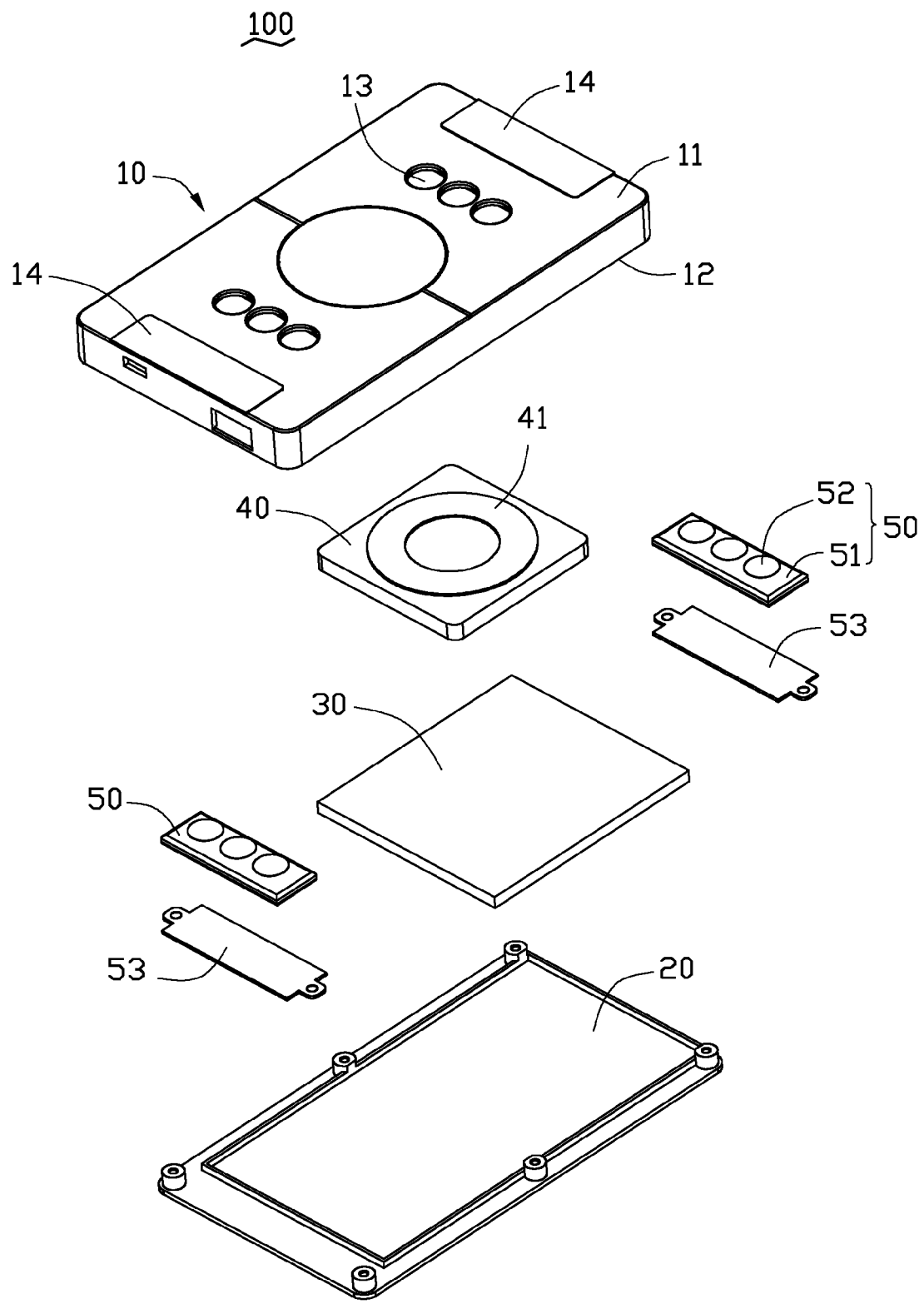
FIG. 2 is a disassembled view of the wireless charging device of FIG. 1.

Referring to FIGS. 1 and 2, a wireless charging device 100 in accordance with an exemplary embodiment of the present disclosure is illustrated. The wireless charging device 100 is used for charging a portable electronic device such as mobile phone. The wireless charging device 100 includes a charging panel 10, a bottom cover 20, a power source 30, a transmitting unit 40 and an absorbent unit 50.

The charging panel 10 includes a first surface 11 and a second surface 12 opposite to the first surface 11. The first surface 11 supports the portable electronic device thereon. The charging panel 10 defines a plurality of through holes 13 running through the first surface 11 and the second surface 12. In the present embodiment, the charging panel 10 includes six through holes 13 arranged in two lines. Two slippery mats 14 made of high surface friction materials are respectively arranged on two opposite ends of the charging panel 10. The slippery mats 14 can prevent the portable electronic device from falling from the wireless charging device 100.

The bottom cover 20 and the charging panel 10 cooperatively define a cavity to receive the power source 30, the transmitting unit 40 and the absorbent unit 50. The power source 30 is received in the cavity for storing power. In this embodiment, the power source 30 is a chargeable battery.

The transmitting unit 40 includes a coil 41. The coil 41 can generate electromagnetic signals. In the present embodiment, the transmitting unit 40 is arranged on and electrically connected to the power source 30. The coil 41 can be one, two, or more than two. In an alternative embodiment, the transmitting unit 40 can be electrically connected to an external power source for generating electromagnetic signals.

In the present embodiment, the wireless charging device 100 includes two absorbent units 50 arranged on two opposite sides of the transmitting unit 40. Each absorbent unit 50 includes a main body 51 and at least one absorbent portion 52 arranged on the main body 51. The absorbent portion 52 is a vacuum suction cup, and is made of rubber. Each absorbent unit 50 is fixed on the bottom cover 20 by a holder 53. In the present embodiment, each absorbent unit 50 includes three absorbent portions 52 corresponding to the through holes 13. Each absorbent portion 52 extends through a corresponding through hole 13 for adsorbing the portable electronic device.

The absorbent unit 50 can absorb the portable electronic device when the portable electronic device is charged, whereby the portable electronic device can be arranged on the charging panel steady.

It is to be further understood that even though numerous characteristics and advantages have been set forth in the foregoing description of embodiments, together with details of the structures and functions of the embodiments, the disclosure is illustrative only; and that changes may be made in detail, especially in matters of shape, size, and arrangement of parts within the principles of the disclosure to the full extent indicated by the broad general meaning of the terms in which the appended claims are expressed.

What is claimed is:

1. A wireless charging device for charging a portable electronic device, comprising:
   a charging panel comprising a first surface and a second surface opposite to the first surface, the first surface for supporting the portable electronic device, the charging panel defining a plurality of through holes extending through the first surface;
   a transmitting unit comprising a coil electrically connecting to a power source for generating electromagnetic signals transmitted through said first surface for charging the portable electronic device; and
   a plurality absorbent units, each of the absorbent units comprising an absorbent portion passing through the through hole of the charging panel for adsorbing the portable electronic device thereto, a free end surface of the absorbent portion for adsorbing the portable electronic device being coplanar with the first surface of the charging panel.

2. The wireless charging device of claim 1, wherein the power source supplies the wireless charging device with power for operating the transmitting unit.

3. The wireless charging device of claim 1, wherein the absorbent portion is made of rubber.

4. The wireless charging device of claim 1, wherein the absorbent portion is a vacuum suction.

5. The wireless charging device of claim 1 comprising two absorbent units, wherein each absorbent unit comprises a plurality of absorbent portions.

6. The wireless charging device of claim 5, wherein the two absorbent units are arranged on two opposite sides of the transmitting unit.

7. The wireless charging device of claim 1, further comprising a holder for supporting the absorbent unit.

8. The wireless charging device of claim 1, further comprising two slippery mats arranged on two opposite ends of the first surface of the charging panel.

9. The wireless charging device of claim 1, further comprising a bottom cover, the bottom cover and the charging panel cooperatively defining a cavity for receiving the transmitting unit and the absorbent unit.

10. The wireless charging device of claim 9, wherein each absorbent unit is fixed on the bottom cover by a holder.

* * * * *